United States Patent
Kim et al.

(10) Patent No.: US 9,641,347 B2
(45) Date of Patent: May 2, 2017

(54) METHOD AND DEVICE FOR SELECTING PACKET DATA NETWORK GATEWAY IN WIRELESS COMMUNICATION SYSTEM

(71) Applicant: LG ELECTRONICS INC., Seoul (KR)

(72) Inventors: Hyunsook Kim, Anyang-si (KR); Jaehyun Kim, Anyang-si (KR); Laeyoung Kim, Anyang-si (KR); Taehyeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/434,059

(22) PCT Filed: Jul. 16, 2013

(86) PCT No.: PCT/KR2013/006346
§ 371 (c)(1),
(2) Date: Apr. 7, 2015

(87) PCT Pub. No.: WO2014/058135
PCT Pub. Date: Apr. 17, 2014

(65) Prior Publication Data
US 2015/0256349 A1     Sep. 10, 2015

Related U.S. Application Data

(60) Provisional application No. 61/710,779, filed on Oct. 8, 2012, provisional application No. 61/773,151, filed
(Continued)

(51) Int. Cl.
*H04L 12/14* (2006.01)
*H04W 60/00* (2009.01)
(Continued)

(52) U.S. Cl.
CPC ...... *H04L 12/1407* (2013.01); *H04L 41/0893* (2013.01); *H04W 4/08* (2013.01);
(Continued)

(58) Field of Classification Search
CPC .................................................. H04L 12/1407
(Continued)

(56) References Cited

U.S. PATENT DOCUMENTS 8,566,455 B1 * 10/2013 Zhao .................. H04W 76/025
709/227
8,787,318 B2 * 7/2014 Pampu .......................... 370/331
(Continued)

FOREIGN PATENT DOCUMENTS

WO    2012/034598    3/2012

OTHER PUBLICATIONS

3rd Generation Partnership Project (3GPP), "Technical Specification Group Services and System Aspects; Policy and charging control architecture (Release 11)," 3GPP TS 23.203 V11.7.0, Sep. 2012, 178 pages.
(Continued)

*Primary Examiner* — Jung Park
*Assistant Examiner* — Andrew C Lee
(74) *Attorney, Agent, or Firm* — Lee Hong Degerman Kang Waimey

(57) ABSTRACT

One embodiment of the present invention is a method whereby a network node selects a packet data network gateway (P-GW) in a wireless communication system, the method for selecting a P-GW comprising the steps of: receiving, from user equipment, an attach request including information on a group; determining whether or not the attach request is a first request from the group; and selecting a P-GW to perform a policy and charging enforcement function (PCEF) on the group including the user equipment,
(Continued)

wherein the selected P-GW is the same P-GW selected for the group in case the attach request is a third or later request from the group.

11 Claims, 12 Drawing Sheets

Related U.S. Application Data on Mar. 6, 2013, provisional application No. 61/775,701, filed on Mar. 11, 2013.

(51) Int. Cl.
*H04W 4/08* (2009.01)
*H04W 48/20* (2009.01)
*H04L 12/24* (2006.01)
*H04W 88/16* (2009.01)
*H04M 15/00* (2006.01)

(52) U.S. Cl.
CPC ........... *H04W 48/20* (2013.01); *H04W 60/00* (2013.01); *H04M 15/66* (2013.01); *H04M 15/765* (2013.01); *H04W 88/16* (2013.01)

(58) Field of Classification Search
USPC ............... 370/259, 225, 328, 331, 236, 254
See application file for complete search history.

(56) References Cited

U.S. PATENT DOCUMENTS

| | | | |
|---|---|---|---|
| 2011/0075675 A1* | 3/2011 | Koodli | H04L 12/14 370/401 |
| 2011/0138066 A1* | 6/2011 | Kopplin | H04L 47/10 709/228 |
| 2011/0170517 A1* | 7/2011 | Bakker | H04W 36/0033 370/331 |
| 2011/0320608 A1* | 12/2011 | Nelakonda | H04L 12/00 709/226 |
| 2012/0063300 A1* | 3/2012 | Sahin | H04W 36/12 370/225 |
| 2012/0106391 A1* | 5/2012 | van Loon | H04L 12/1886 370/252 |
| 2012/0109800 A1* | 5/2012 | Zhou | G06Q 30/04 705/34 |
| 2012/0113855 A1* | 5/2012 | Wu | H04L 12/14 370/252 |
| 2012/0113959 A1* | 5/2012 | Sugizaki | H04W 36/0016 370/331 |
| 2012/0185576 A1* | 7/2012 | Qu | H04W 4/08 709/223 |
| 2012/0195299 A1 | 8/2012 | Liang et al. | |
| 2012/0224564 A1* | 9/2012 | Paisal | H04N 7/148 370/331 |
| 2012/0246325 A1* | 9/2012 | Pancorbo Marcos | H04L 12/2602 709/227 |
| 2012/0275348 A1* | 11/2012 | Zhou | H04L 12/14 370/259 |
| 2012/0275384 A1* | 11/2012 | Long | H04L 65/1089 370/328 |
| 2012/0282941 A1* | 11/2012 | Lu | H04W 48/20 455/452.1 |
| 2012/0287854 A1* | 11/2012 | Xie | H04W 48/08 370/328 |
| 2012/0307798 A1* | 12/2012 | Zhou | H04W 4/00 370/331 |
| 2012/0324100 A1* | 12/2012 | Tomici | H04L 45/123 709/224 |
| 2013/0021972 A1* | 1/2013 | Lim | H04W 4/08 370/328 |
| 2013/0155948 A1* | 6/2013 | Pinheiro | H04W 4/005 370/328 |
| 2013/0196704 A1* | 8/2013 | Jain | H04L 1/1864 455/518 |

OTHER PUBLICATIONS

ZTE, "Policing solution for MTC Groups," 3GPP TSG SA WG2 Meeting #92, SA WG2 Temporary Document, TD S2-122849, Jul. 2012, 2 pages.

3rd Generation Partnership Project (3GPP), Technical Specification Group Services and System Aspects; General Packet Radio Service (GPRS) enhancements for Evolved Universal Terrestrial Radio Access Network (E-UTRAN) access (Release 11), 3GPP TS 23.401 V11.3.0, Sep. 2012, 284 pages.

PCT International Application No. PCT/KR2013/006346, Written Opinion of the International Searching Authority dated Oct. 22, 2013, 22 pages.

\* cited by examiner

FIG. 3
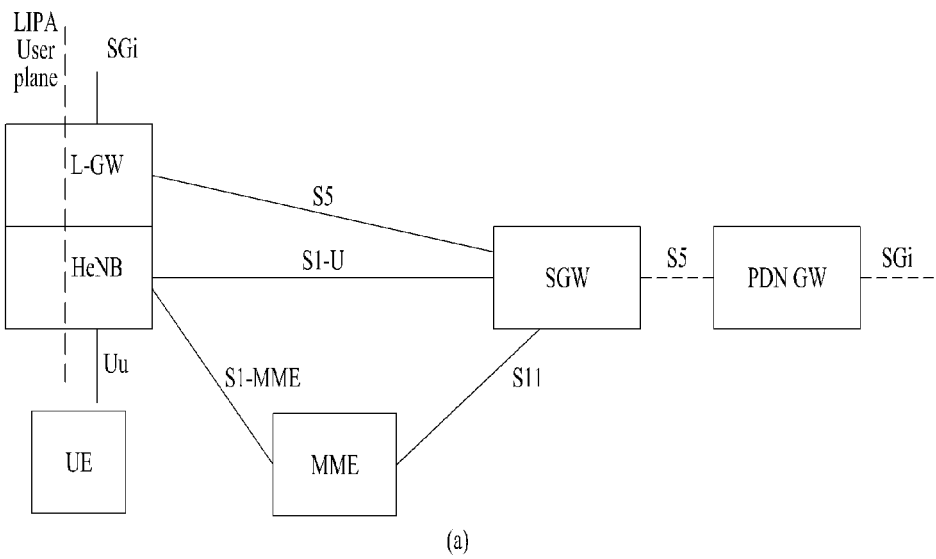
(a)
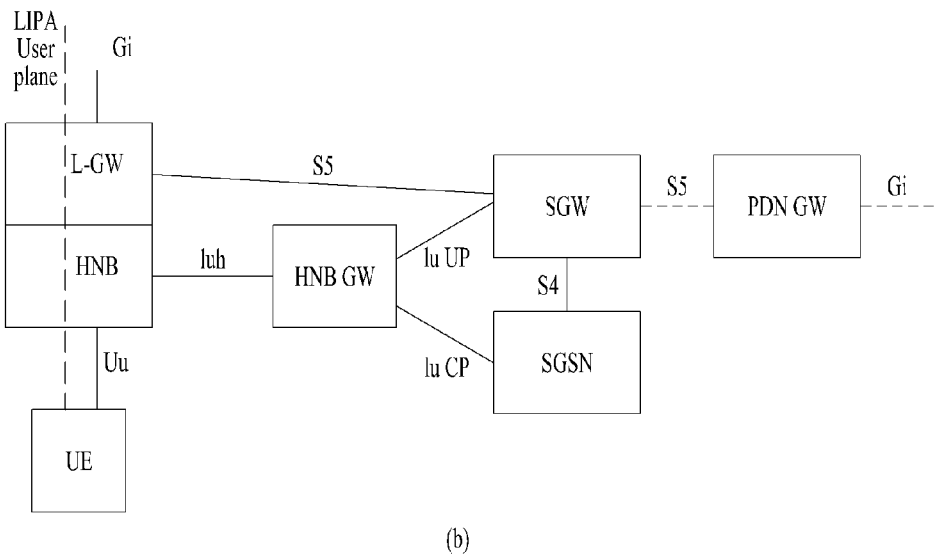
(b)
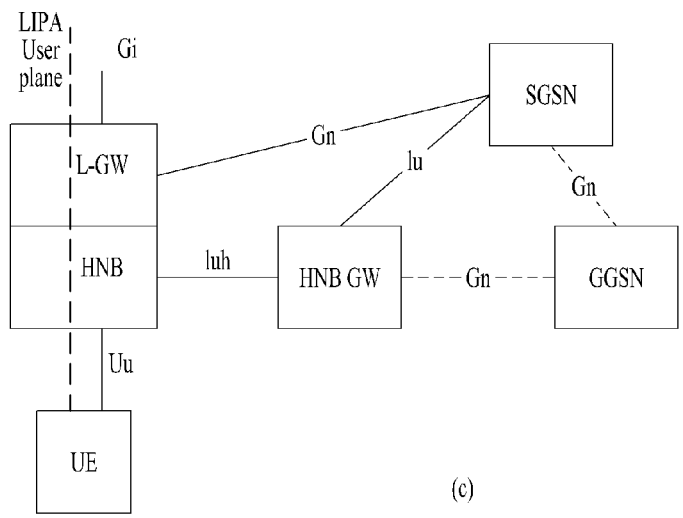
(c)

FIG. 9
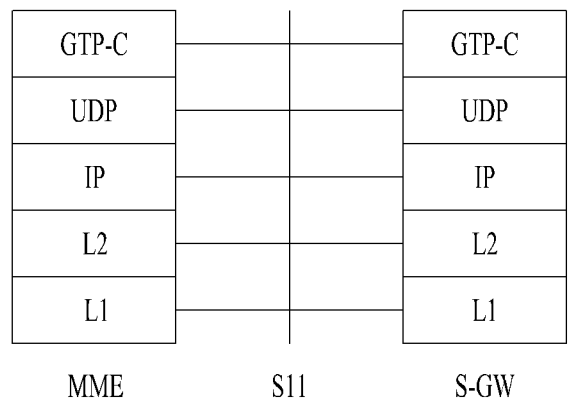
(a)
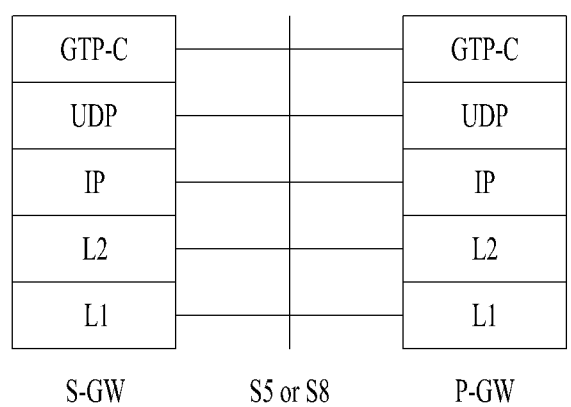
(b)

METHOD AND DEVICE FOR SELECTING PACKET DATA NETWORK GATEWAY IN WIRELESS COMMUNICATION SYSTEM

CROSS-REFERENCE TO RELATED APPLICATIONS

This application is the National Stage filing under 35 U.S.C. 371 of International Application No. PCT/KR2013/006346, filed on Jul. 16, 2013, which claims the benefit of U.S. Provisional Application Ser. No. 61/710,779, filed on Oct. 8, 2012, 61/773,151, filed on Mar. 6, 2013 and 61/775,701, filed on Mar. 11, 2013, the contents of which are all hereby incorporated by reference herein in their entirety.

TECHNICAL FIELD

The following description relates to a wireless communication system and, more specifically, to a method and device for selecting a packet data network gateway (P-GW) for an MTC group.

BACKGROUND ART

Machine type communication (MTC) refers to a communication scheme using one or more machines and is also referred to as machine-to-machine (M2M) communication. Here, a machine refers to an entity that does not require direct human operation or intervention. For instance, examples of the machine can include user equipment such as a smartphone capable of automatically accessing a network without operation/intervention of a user to perform communication as well as apparatuses such as meters or vending machines equipped with a mobile communication module. Various examples of the machine are referred to as MTC devices or terminals in the specification. That is, MTC refers to communication performed by one or more machines (i.e. MTC devices) without human operation/intervention.

MTC can include communication between MTC devices (e.g. device-to-device (D2D) communication) and communication between an MTC device and an MTC application server. Examples of communication between an MTC device and an MTC application server can include communication between a vending machine and a server, communication between a point of sale (POS) device and a server, communication between an electricity, gas or water meter and a server and the like. In addition, applications based on MTC can include security, transportation, healthcare and the like.

DISCLOSURE

Technical Problem

An object of the present invention devised to solve the problem lies in a method for selecting a P-GW to perform a policy and charging enforcement function (PCEF) for an MTC group, a method for supporting P-GW selection and a network node apparatus for the same.

The technical problems solved by the present invention are not limited to the above technical problems and those skilled in the art may understand other technical problems from the following description.

Technical Solution

In a first technical aspect of the present invention, a method for selecting a packet data network gateway (P-GW) by a network node in a wireless communication system includes: receiving, from user equipment, an attach request including information on a group; determining whether or not the attach request is a first request from the group; and selecting a P-GW to perform a policy and charging enforcement function (PCEF) on the group including the user equipment, wherein the selected P-GW is the same P-GW as that selected for the group when the attach request is a third or later request from the group.

The first technical aspect of the present invention may include the following.

When the attach request is the first request from the group, the network node may transmit information on the selected P-GW to an HSS for registration.

The method may further include checking whether or not a P-GW selected for the group is present when the attach request is the third or later request from the group.

The attach request may be held for a predetermined time when the P-GW selected for the group is not present.

The predetermined time may correspond to a time necessary for P-GW selection according to the first request from the group.

The function of PCEF may include group aggregated maximum bit rate (AMBR) management of the group on the basis of a user plane data MBR of the user equipment.

The selected P-GW may be for one APN.

The network node may be one of a mobility management entity (MME) and a serving general packet radio service (SGSN) supporting node.

In a second technical aspect of the present invention, a method whereby a network node supports P-GW selection in a wireless communication system includes: receiving a request with respect to selection of a PCEF of a group; determining whether the request with respect to selection of the PCEF is a first request from the group; and transmitting, to an MME, information to be used for selection of a P-GW to perform the function of PCEF on the group to which user equipment belongs, wherein the information to be used for P-GW selection includes information on a P-GW pre-selected for the group when the request with respect to PCEF selection is a third or later request from the group.

The second technical aspect of the present invention may include the following.

The network node may receive information on the selected P-GW and then register the information when the request with respect to PCEF selection is the first request from the group.

The method may further include checking whether or not a P-GW selected for the group is present when the request with respect to PCEF selection is the third or later request from the group.

Transmission of a response to the request with respect to PCEF selection may be held for a predetermined time when the P-GW pre-selected for the group is not present.

The predetermined time may correspond to a time necessary for P-GW selection according to the first request from the group.

The function of PCEF may include group AMBR management of the group on the basis of a user plane data MBR of the user equipment.

The selected P-GW may be for one APN.

The network node may be an HSS.

Advantageous Effects

According to embodiments of the present invention, it is possible to commonly select a P-GW for an MTC so as to efficiently perform group policy enforcement.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 3 illustrates exemplary LIPA structures;

FIG. 9 illustrates a control plane between an MME and an S-GW and a control plane between an S-GW and a P-GW;

BEST MODE

Figure 1:
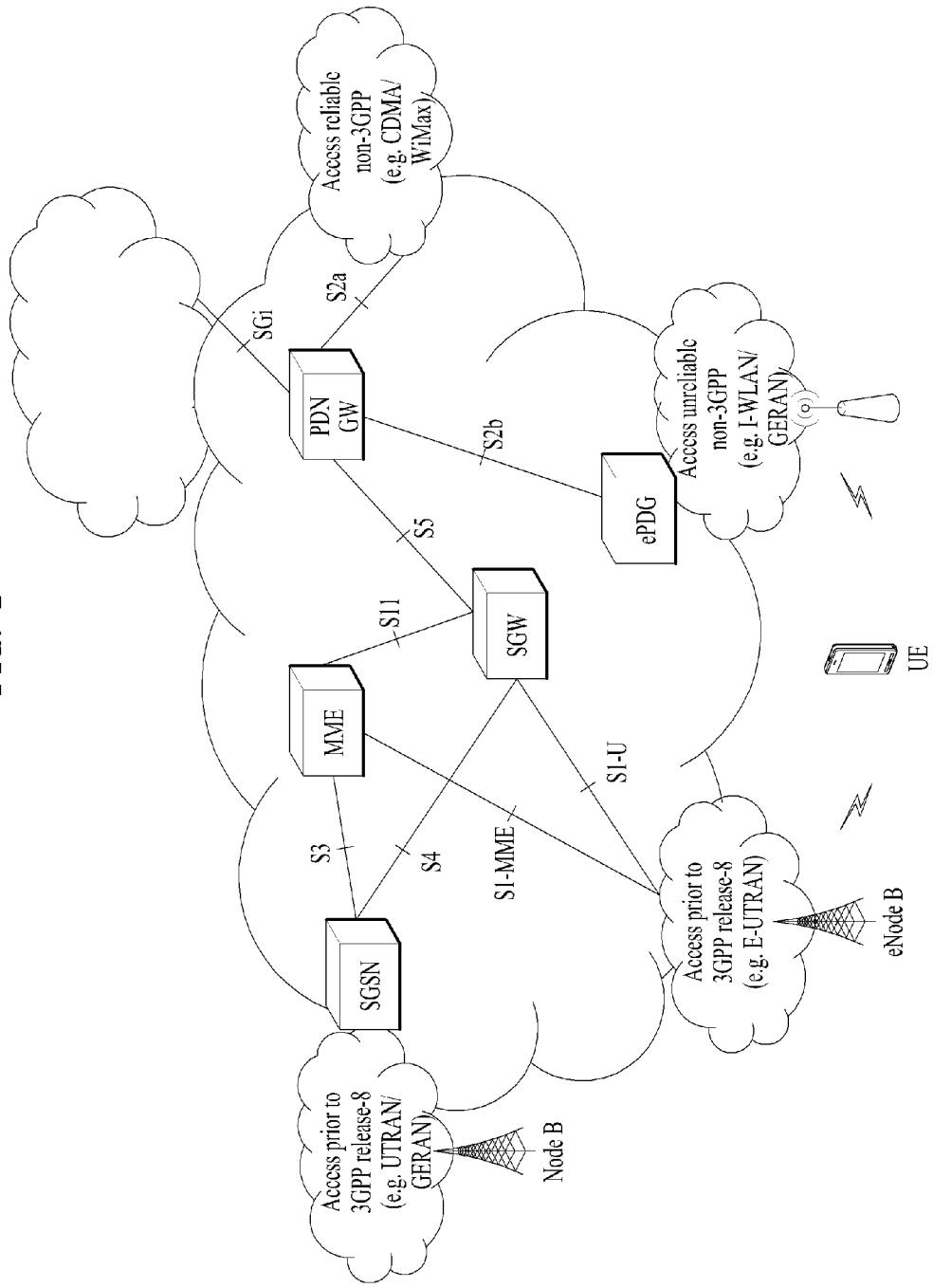
FIG. 1 illustrates a configuration of an evolved packet system (EPS) including an evolved packet core (EPC)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems. For clarity, the present disclosure focuses on 3GPP LTE and LTE-A systems. However, the technical features of the present invention are not limited thereto.

Terms used in the following description are defined as follows.

UMTS (Universal Mobile Telecommunication System): 3$^{rd}$ generation mobile communication technology based on a Global System for Mobile Communication (GSM) developed by 3GPP.

EPS (Evolved Packet System): Network system including an Evolved Packet Core (EPC) which is a Packet Switched (PS) core network based on Internet Protocol (IP) and an access network such as LTE or UMTS Terrestrial Radio Access Network (UTRAN), which is evolved from UMTS.

NodeB: Base station of a GSM (Global System for Mobile Communication)/EDGE (Enhanced Data rates for Global Evolution) Radio Access Network (GERAN)/UTRAN, which is installed outdoors and has a coverage corresponding to a macro cell.

eNB (eNodeB): Base station of an LTE network, which is installed outdoors and has a coverage corresponding to a macro cell.

UE (User Equipment): UE can also be referred to as a terminal, a Mobile Equipment (ME), a Mobile Station (MS) or the like. In addition, the UE can be a portable device such as a laptop computer, a mobile phone, a Personal Digital Assistant (PDA), a smartphone or a multimedia device, or a non-portable device such as a Personal Computer (PC) or a vehicle-mounted device.

RAN (Radio Access Network): Unit including a NodeB, an eNodeB and a Radio Network Controller (RNC) for controlling the NodeB and the eNodeB in a 3GPP network, which is present between UEs and a core network and provides a connection to the core network.

HLR (Home Location Register)/HSS (Home Subscriber Server): Database having subscriber information in a 3GPP network. The HSS can perform functions such as configuration storage, identity management and user state storage.

RANAP (RAN Application Part): Interface between nodes (e.g., Mobility Management Entity (MME)/Serving GPRS (General Packet Radio Service) Support Node (SGSN)/Mobile Switching Center (MSC)) configured to control a RAN and a core network.

PLMN (Public Land Mobile Network): Network configured for the purpose of providing mobile communication services to individuals. This network can be configured per operator.

NAS (Non-Access Stratum): Functional layer for signaling and exchanging traffic messages between a UE and a core network in a UMTS protocol stack. Major functions thereof are to support UE mobility and to support a session management procedure for establishing and maintaining an IP connection between a UE and a Packet Data Network Gateway (PDN GW).

HNB (Home NodeB): Customer Premises Equipment (CPE) for providing UTRAN coverage. For details thereof, reference can be made to 3GPP TS 25.467.

HeNodeB (Home eNodeB): CPE for providing Evolved-UTRAN (E-UTRAN) coverage. For details thereof, reference can be made to 3GPP TS 36.300.

CSG (Closed Subscriber Group): Group of subscribers who are permitted to access one or more CSG cells of a Public Land Mobile Network (PLMN) as members of a CSG of a H(e)NB.

CSG ID: Unique identifier for identifying a CSG within a range of PLMN associated with a CSG cell or a CSG cell group. For details thereof, reference can be made to 3GPP TS 23.003.

LIPA (Local IP Access): Access of an IP capable UE via a H(e)NB to another IP capable entity within the same residential/enterprise IP network. LIPA traffic does not traverse a mobile operator's network. 3GPP Rel-10 feature providing access to resources on the Local Network (LN) (e.g., the network located inside the customer's home or enterprise premises) via a H(e)NB.

MRA (Managed Remote Access): Access of a CSG member to an IP capable entity connected to a home based network from outside the home based network. For example, a user located outside a local network can receive user data services from the local network using MRA.

SIPTO (Selected IP Traffic Offload): 3GPP Rel-10 feature allowing the operator to offload of user's traffic by selecting a Packet data network GateWay (PGW) residing close to the Evolved Packet Core (EPC) network edge.

SIPTO@LN (SIPTO at Local Network): SIPTO@LN is an enhancement of the Rel-10 SIPTO feature and allows the operator to offload user's traffic via the Local Network (LN) inside the customer's premises. In contrast to Rel-10 LIPA, whose aim is to provide access to resources on the local network itself, the SIPTO@LN feature aims at providing access to external networks (e.g., Internet) via the local network (the underlying assumption being that the Local Network eventually has connectivity towards the desired external network).

PDN (Packet Data Network) Connection: Logical connection between a UE indicated by a single IP address (e.g., single IPv4 address and/or single IPv6 prefix) and a PDN indicated by an Access Point Name (APN).

LIPA PDN connection: PDN connection for LIPA of a UE connected to a H(e)NB.

LIPA-Permission: This indicates whether an APN is accessible through LIPA and the following three values are defined.

LIPA-Prohibited: APN to which access through LIPA is prohibited. That is, user plane data can access such APN via an EPC only.

LIPA-Only: APN accessible only through LIPA.

LIPA-Conditional: APN accessible in a non-LIPA manner (i.e., via an EPC) and accessible through LIPA.

Hereinafter, a description will be given based on the above-defined terms.

EPC (Evolved Packet Core)

FIG. 1 is a view schematically illustrating the architecture of an Evolved Packet System (EPS) including an Evolved Packet Core (EPC).

The EPC is a fundamental element of System Architecture Evolution (SAE) for improving the performance of 3GPP technologies. SAE corresponds to a study item for determining a network architecture supporting mobility between various types of networks. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In the legacy mobile communication system (i.e., $2^{nd}$ Generation (2G) or $3^{rd}$ Generation (3G) mobile communication system), the function of a core network is implemented through two distinct sub-domains, e.g., a Circuit-Switched (CS) sub-domain for voice and a Packet-Switched (PS) sub-domain for data. In a 3GPP LTE system evolved from the 3G communication system, the CS and PS sub-domains are unified into a single IP domain. That is, in the 3GPP LTE system, a connection between UEs having IP capability can be established through an IP-based base station (e.g., evolved NodeB (eNodeB)), an EPC and an application domain (e.g., IP Multimedia Subsystem (IMS)). That is, the EPC is an architecture inevitably required to implement end-to-end IP services.

The EPC may include various components. FIG. 1 illustrates some of the components, e.g., Serving Gateway (SGW), Packet Data Network Gateway (PDN GW), Mobility Management Entity (MME), Serving GPRS (General Packet Radio Service) Supporting Node (SGSN) and enhanced Packet Data Gateway (ePDG).

The SGW operates as a boundary point between a Radio Access Network (RAN) and a core network and is an element functioning to maintain a data path between an eNodeB and a PDN GW. In addition, if a UE moves over a region served by an eNodeB, the SGW serves as a local mobility anchor point. That is, packets may be routed through the SGW for mobility in an Evolved-UMTS (Universal Mobile Telecommunications System) Terrestrial Radio Access Network (E-UTRAN) defined after 3GPP Rel-8. Further, the SGW may serve as an anchor point for mobility with another 3GPP network (a RAN defined before 3GPP Rel-8, e.g., UTRAN or GERAN.

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) network or WiMax network).

Although the SGW and the PDN GW are configured as separate gateways in the network architecture of FIG. 1, the two gateways may be implemented depending on a single gateway configuration option.

The MME performs signaling and control functions for supporting access for a network connection of a UE, allocation of network resources, tracking, paging, roaming and handover. The MME controls control plane functions related to subscriber and session management. The MME manages a large number of eNodeBs and performs signaling for selection of a conventional gateway for handover to another 2G/3G network. In addition, the MME performs security procedures, terminal-to-network session handling, idle terminal location management, etc.

The SGSN handles all packet data for mobility management of a user to another 3GPP network (e.g., GPRS network) and authentication of the user.

The ePDG serves as a security node for an untrusted non-3GPP network (e.g., I-WLAN or Wi-Fi hotspot).

As described above in relation to FIG. 1, a UE having IP capabilities may access an IP service network (e.g., IMS) provided by an operator via various elements in the EPC based on not only 3GPP access but also non-3GPP access.

FIG. 1 illustrates various reference points (e.g., S1-U and S1-MME). In the 3GPP system, a conceptual link for connecting two functions, which are present in different functional entities of E-UTRAN and EPC, is defined as a reference point. Table 1 shows the reference points illustrated in FIG. 1. Various reference points other than those of Table 1 may also be present depending on the network architecture.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing related control and mobility support between the trusted non-3GPP access and the PDNGW to a user plane. S2b is a reference point for providing related control and mobility support between the ePDG and the PDN GW to the user plane.

Figure 2:
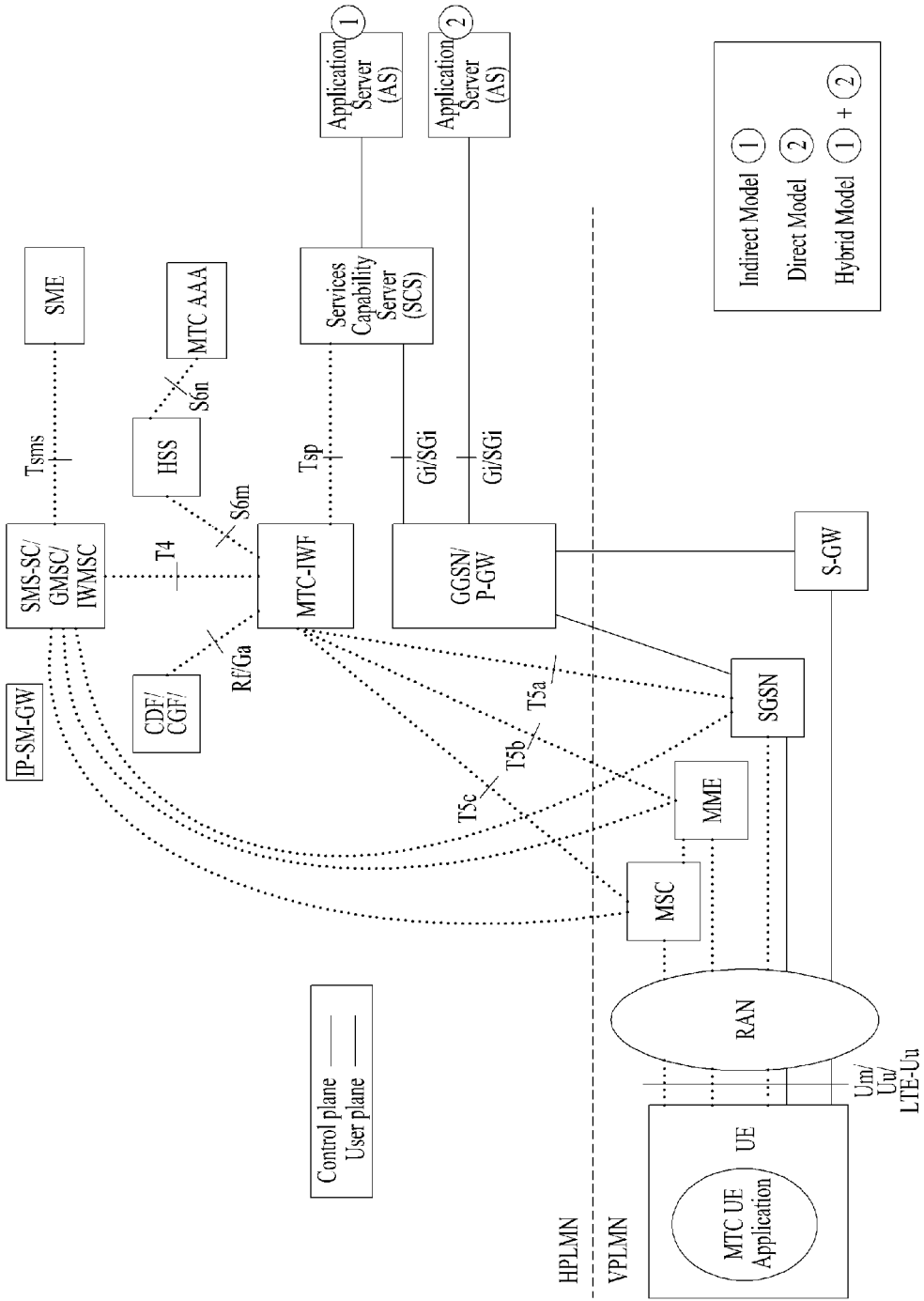
FIG. 2 illustrates an exemplary model of an MTC structure.

FIG. 2 is a view illustrating an exemplary model of an MTC architecture.

An end-to-end application between a UE (or an MTC UE) used for MTC and an MTC application may use services provided by a 3GPP system and selective services provided by an MTC server. The 3GPP system may provide transport and communication services (including 3GPP bearer service, IMS and SMS) including a variety of optimization services for facilitating MTC. In FIG. 2, the UE used for MTC is connected to a 3GPP network (e.g., UTRAN, E-UTRAN, GERAN or I-WLAN) through a Um/Uu/LTE-Uu interface. The architecture of FIG. 2 includes various MTC models (e.g., direct model, indirect model and hybrid model).

A description is now given of entities illustrated in FIG. 2.

In FIG. 2, an application server is a server for executing an MTC application on a network. The above-described various technologies for implementing MTC applications are applicable to an MTC application server and a detailed description thereof is omitted here. In addition, the MTC application server may access an MTC server through a reference point API and a detailed description thereof is omitted here. Alternatively, the MTC application server may be co-located with the MTC server.

An MTC server (e.g., SCS server in FIG. 2) is a server for managing MTC UEs on a network and may be connected to the 3GPP network to communicate with the UE used for MTC and nodes of PLMN.

An MTC-InterWorking Function (IWF) may control interworking between an MTC server and a core network of an operator and serve as a proxy for MTC operation. To support an MTC indirect or hybrid model, one or more MTC-IWFs may be present within a Home PLMN (HPLMN). The MTC-IWF may relay and analyze a signaling protocol on a reference point Tsp to operate a specific function in the PLMN. The MTC-IWF may perform a function for authenticating the MTC server before the MTC server establishes communication with the 3GPP network, a function for authenticating a control plane request from the MTC server, various functions related to trigger instructions to be described below, etc.

A Short Message Service-Service Center (SMS-SC)/Internet Protocol Short Message GateWay (IP-SM-GW) may manage transmission and reception of an SMS. The SMS-SC may serve to relay a short message between a Short Message Entity (SME) (i.e., an entity for transmitting or receiving a short message) and a mobile station and to store and deliver the short message. The IP-SM-GW may serve to perform protocol interworking between the UE and the SMS-SC based on IP.

A Charging Data Function (CDF)/Charging Gateway Function (CGF) may perform operations related to charging.

An HLR/HSS may serve to store and provide subscriber information (e.g., IMSI), routing information, configuration information, etc. to the MTC-IWF.

An MSC/SGSN/MME may perform control functions such as mobility management, authentication and resource allocation for a network connection of a UE. The MSC/SGSN/MME may receive a trigger instruction from the MTC-IWF in relation to triggering to be described below, and process the trigger instruction into the form of a message to be provided to the MTC UE.

A Gateway GPRS Support Node (GGSN)/Serving-Gateway (S-GW)+Packet Data Network-Gateway (P-GW) may serve as a gateway for connecting a core network and an external network.

Table 2 shows major reference points illustrated in FIG. 2.

TABLE 2

| Reference Point | Description |
| --- | --- |
| Tsms | It is the reference point an entity outside the 3GPP system uses to communicate with UEs used for MTC via SMS. |
| Tsp | It is the reference point an entity outside the 3GPP system uses to communicate with the MTC-IWF related control plane signalling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWF and serving MME. |
| T5c | Reference point used between MTC-IWF and serving MSC. |
| S6m | Reference point used by MTC-IWF to interrogate HSS/HLR for E.164 MSISDN or external identifier mapping to IMSI and gather UE reachability and configuration information. |

One or more reference points among T5a, T5b and T5c are referred to as T5.

User plane communication with an MTC server in case of the indirect and hybrid models, and communication with an MTC application server in case of the direct and hybrid models may be performed using a legacy protocol through reference points Gi and SGi.

The descriptions given above in relation to FIG. 2 can be incorporated by reference in this specification by referring to 3GPP TS 23.682.

In the case of MTC, more MTC UEs than normal UEs are expected to be present on a network. Accordingly, MTC is required to minimize use of network resources, signaling and power.

In addition, an MTC UE may not establish an IP connection to an MTC application server at ordinary times to minimize use of system resources. If the MTC UE does not establish an IP connection and thus the MTC application server fails to transmit data to the MTC UE, the MTC UE may be requested or instructed to establish an IP connection and this request or instruction is referred to as a trigger instruction. That is, triggering of the MTC UE is required if an IP address of the MTC UE is unavailable or unreachable by the MTC application server (a fact that a certain entity or an address of the entity is unreachable means that an attempt for message delivery fails because, for example, the entity is absent from the address). To this end, the MTC UE may receive a trigger instruction from the network. Upon receiving the trigger instruction, the MTC UE is required to perform operation of an MTC application embedded therein and/or to establish communication with the MTC application server. Here, when the MTC UE receives the trigger instruction, a) a case in which the MTC UE is offline (i.e., not attached to the network), b) a case in which the MTC UE is online (i.e., attached to the network) but a data connection is not established, or c) a case in which the MTC UE is online (i.e., attached to the network) and a data connection is established, may be assumed.

For example, when an IP connection (or PDN connection) through which the MTC UE can receive data from the MTC application server is not established (or when the MTC UE can receive basic control signals but cannot receive user data), triggering of the MTC UE may be an operation for allowing the MTC UE to perform operation of an MTC application embedded therein and/or to request the MTC application server for an IP connection using a trigger message. In addition, the trigger message may include information for allowing the network to route a message to an appropriate MTC UE and allowing the MTC UE to route the message to an appropriate application of the MTC UE (hereinafter referred to as trigger information).

FIG. 3 is a view illustrating exemplary LIPA architectures.

FIGS. 3(a) to 3(c) correspond to examples of the H(e)NB subsystem architecture for LIPA defined in 3GPP Rel-10. Here, the LIPA architecture defined in 3GPP Rel-10 is restricted to a case in which a H(e)NB and a Local-GateWay (LGW) are co-located. However, this is merely an example and the principle of the present invention is also applicable to a case in which the H(e)NB and the LGW are located separately.

FIG. 3(a) illustrates a LIPA architecture for a HeNB using a local PDN connection. Although not shown in FIG. 3(a), a HeNB subsystem may include a HeNB and may optionally include a HeNB and/or an LGW. A LIPA function may be performed using the LGW co-located with the HeNB. The HeNB subsystem may be connected to an MME and an SGW of an EPC through an S1 interface. When LIPA is activated, the LGW has an S5 interface with the SGW. The LGW is a gateway toward an IP network (e.g., residential/enterprise network) associated with the HeNB, and may perform PDN GW functions such as UE IP address assignment, Dynamic Host Configuration Protocol (DHCP) function and packet screening. In the LIPA architecture, a control plane is configured using an EPC but a user plane is configured within a local network.

FIGS. 3(b) and 3(c) illustrate architectures of an HNB subsystem including an HNB and an HNB GW, and a LIPA function may be performed using an LGW co-located with the HNB. FIG. 3(b) illustrates an example of a case in which the HNB is connected to an EPC and FIG. 3(c) illustrates an example of a case in which the HNB is connected to an SGSN. For details of the LIPA architectures of FIG. 3, reference can be made to 3GPP TS 23.401 and TS 23.060.

PDN Connection

A PDN connection refers to a logical connection between a UE (specifically, an IP address of the UE) and a PDN. IP connectivity with a PDN for providing a specific service is required to receive the service in a 3GPP system.

3GPP provides multiple simultaneous PDN connections for access of a single UE simultaneously to multiple PDNs. An initial PDN may be configured depending on a default APN. The default APN generally corresponds to a default PDN of an operator, and designation of the default APN may be included in subscriber information stored in an HSS.

If a UE includes a specific APN in a PDN connection request message, access to a corresponding PDN is attempted. After one PDN connection is established, an additional specific PDN connection request message from the UE should always include the specific APN.

A few examples of IP PDN connectivity enabled by an EPS and defined in 3GPP Rel-10 are as described below (use of non-3GPP access is excluded).

The first example is a 3GPP PDN connection via an E-UTRAN. This is the most typical PDN connection in 3GPP.

The second example is a 3GPP PDN connection via a H(e)NB. Except for admission control for CSG membership due to adoption of a H(e)NB, the 3GPP PDN connection via a H(e)NB is established using a procedure similar to that of a PDN connection.

The third example is a LIPA PDN connection. The LIPA PDN connection is established through LIPA admission control depending on LIPA permission as well as admission control based on CSG membership via a H(e)NB.

A detailed description is now given of initial attach operations for the above three 3GPP PDN connections.

Figure 4:
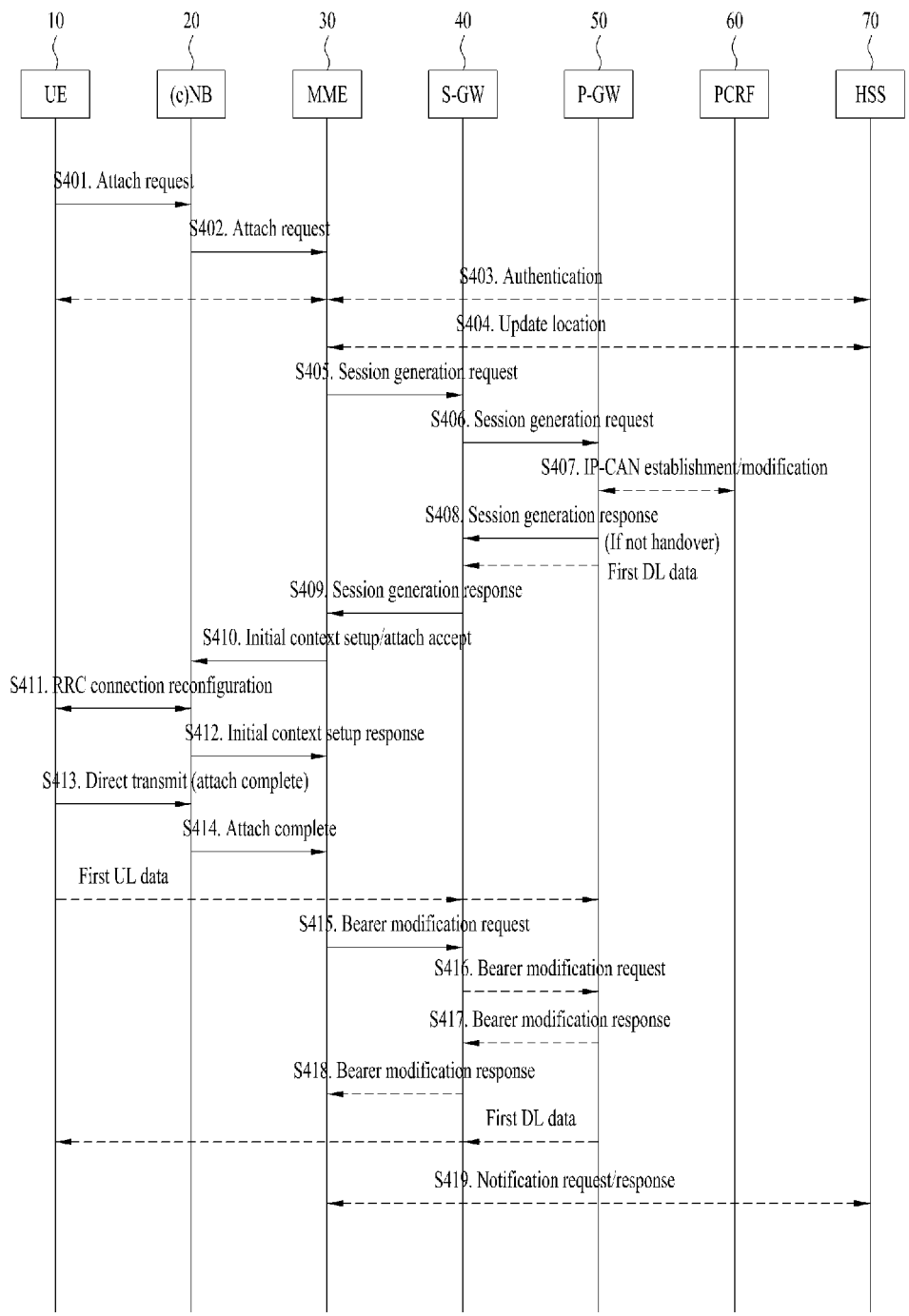
FIG. 4 is a flowchart illustrating an initial attach operation for 3GPP PDN connection through an E-UTRAN.

FIG. 4 is a flowchart for describing an initial attach operation for a 3GPP PDN connection via an E-UTRAN.

In steps S401 and S402, a UE 10 may send an attach request message via an eNB 20 to an MME 30. In this case, the UE 10 may also send an APN of a PDN to which a connection is desired, together with the attach request.

In steps S403 and S404, the MME 30 may perform an authentication procedure on the UE 10, and register location information of the UE 10 in an HSS 70. In this operation, the HSS 70 may transmit subscriber information of the UE 10 to the MME 30.

In steps S405 to S409 (step S407 will be described separately), the MME 30 may send a create session request message to an S-GW 40 to establish an EPS default bearer. The S-GW 40 may send the create session request message to a P-GW 50.

The create session request message may include information such as International Mobile Subscriber Identity (IMSI), Mobile Subscriber Integrated Services Digital Network Number (MSISDN), MME Tunnel Endpoint ID (TEID) for Control Plane, Radio Access Technology (RAT) Type, PDN GW Address, PDN Address, Default EPS Bearer QoS, PDN Type, Subscribed Aggregate Maximum Bit Rate (APN-AMBR), APN, EPS Bearer ID, Protocol Configuration Options, Handover Indication, ME Identity, User Location Information (ECGI), UE Time Zone, User CSG Information, MS Info change Reporting Support Indication, Selection Mode, Charging Characteristics, Trace Reference, Trace Type, Trigger ID, Operation Management Controller (OMC) Identity, Max APN Restriction and Dual Address Bearer Flag.

In response to the create session request message, the P-GW 50 may send a create session response message to the S-GW 40, and the S-GW 40 may send the create session response to the MME 30. Through these operations, the S-GW 40 and the P-GW 50 may exchange TEIDs, and the MME 30 may recognize the TEIDs of the S-GW 40 and the P-GW 50.

As an optional procedure, in step S407, a Policy and Charging Rules Function (PCRF) interaction for operator policies may be performed between a Policy and Charging Enforcement Function (PCEF) of the P-GW 50 and a PCRF 60 as necessary. For example, establishment and/or modification of an IP-Connectivity Access Network (CAN) session may be performed. IP-CAN is a term which refers to one of a variety of IP-based access networks, e.g., 3GPP access network such as GPRS or EDGE, Wireless Local Area Network (WLAN) or Digital Subscriber Line (DSL) network.

In step S410, an attach accept message may be transmitted from the MME 30 to the eNB 20. Together with this message, the TEID of the S-GW 40 for UL data may also be transmitted. This message initiates radio resource setup in a RAN period (between the UE 10 and the eNB 20) by requesting initial context setup.

In step S411, Radio Resource Control (RRC) connection reconfiguration is performed. As such, radio resources of the RAN period are set up and a result thereof may be transmitted to the eNB 20.

In step S412, the eNB 20 may transmit an initial context setup response message to the MME 30. A result of radio bearer setup may also be transmitted together with this message.

In steps S413 and S414, an attach complete message may be sent from the UE 10 via the eNB 20 to the MME 30. In this case, the eNB 20 may also send a TEID of the eNB 20 for DL data together with this message. From this time, UL data may be transmitted via the eNB 20 to the S-GW 40 and the UE 10 may transmit UL data.

In steps S415 to S418, a modify bearer request message may be transmitted from the MME 30 to the S-GW 40 and this message may deliver the TEID of the eNB 20 for DL data to the S-GW 40. As optional operations, in steps S416 and S417, the bearer between the S-GW 40 and the P-GW 50 may be updated as necessary. After that, DL data may be transmitted via the eNB 20 to the UE 10.

As an optional operation, in step S419, if APN, ID of PDN GW, etc. should be stored in the HSS 70 to support mobility to a non-3GPP access network, the MME 30 may perform HSS registration using a notify request message and receive a notify response message from the HSS 70 as necessary.

Figure 5:
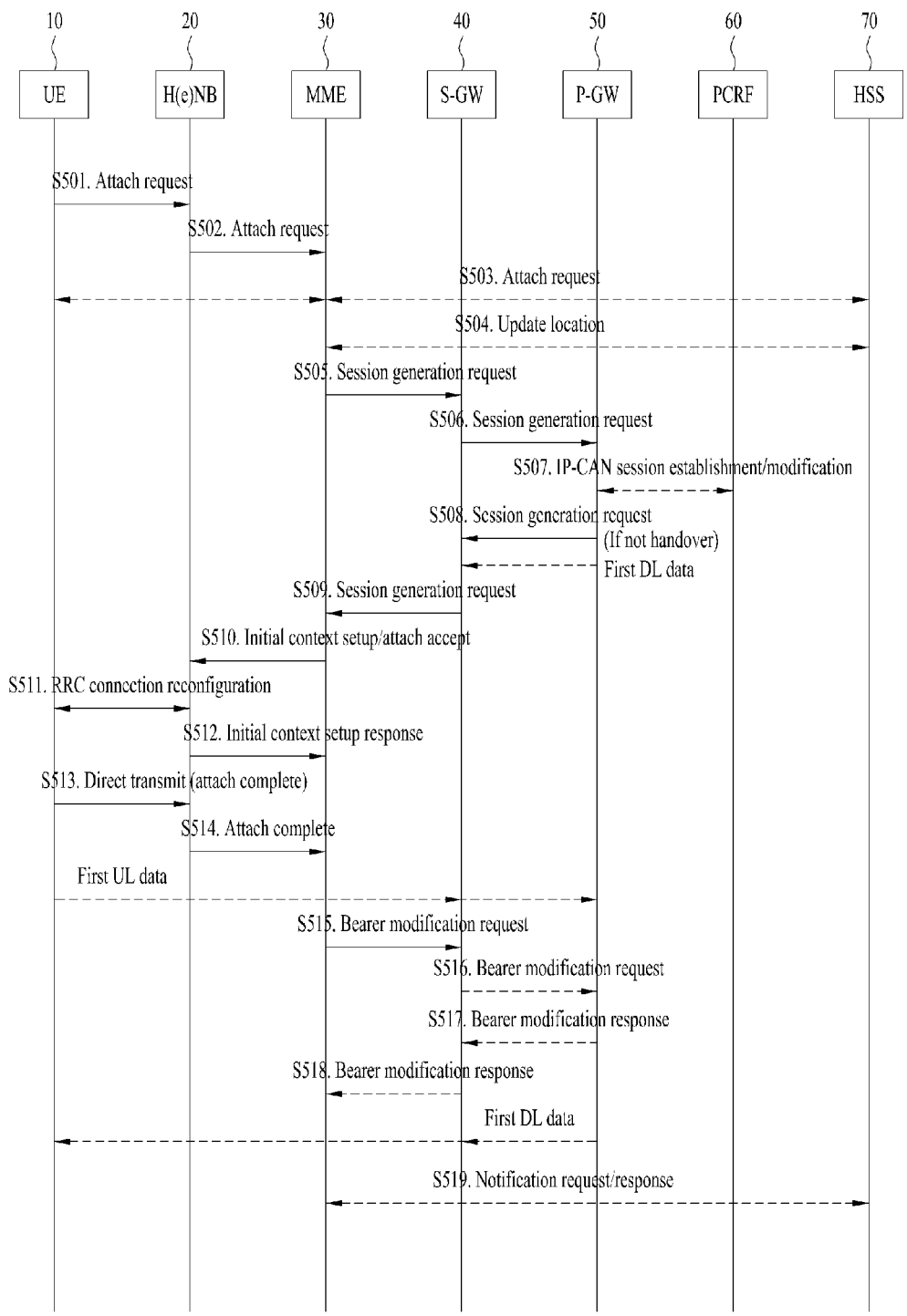
FIG. 5 is a flowchart illustrating an initial attach operation for 3GPP PDN connection through an H(e)NB.

FIG. 5 is a flowchart for describing an initial attach operation for a 3GPP PDN connection via a H(e)NB.

The EPS initial attach procedure via a H(e)NB of FIG. 5 is basically the same as the EPS initial attach procedure via an eNB described above in relation to FIG. 4. That is, if an eNB in the description of FIG. 4 is replaced with a H(e)NB in FIG. 5, the descriptions of steps S401 to S419 of FIG. 4 may be equally applied to steps S501 to S519 of FIG. 5. The following description will be given of only parts added in the EPS initial attach procedure via a H(e)NB of FIG. 5, and parts repeated from the description of FIG. 4 will be omitted here.

In steps S501 and S502, if the UE 10 accesses via a CSG cell, a H(e)NB 20 may transmit an attach request message to the MME 30 by adding a CSG ID and a HeNB access mode to information received from the UE 10. A closed access mode can be assumed when the H(e)NB 20 does not send information about the access mode.

In steps S503 and S504, subscriber information stored in the HSS 70 may also include CSG subscription information. The CSG subscription information may include information about a CSG ID and an expiration time. The CSG subscription information may be additionally provided from the HSS 70 to the MME 30.

In steps S505 to S509, the MME 30 may perform access control based on the CSG subscription information and the H(e)NB access mode and then send a create session request message to the S-GW 40 to establish an EPS default bearer.

In step S510, if the UE 10 accesses via a hybrid cell, CSG membership status of the UE 10 may be included in an attach accept message such that the H(e)NB 20 can differentially control the UE 10 based on the corresponding information. Here, the hybrid access is a mixed form of closed access and open access and the hybrid cell basically serves all users like open access but still has characteristics of a CSG cell. That is, a subscriber belonging to a CSG can be served with higher priority compared to other users and can be charged additionally. This hybrid cell can be clearly distinguished from a closed cell for not providing access of users not belonging to a CSG.

Figure 6:
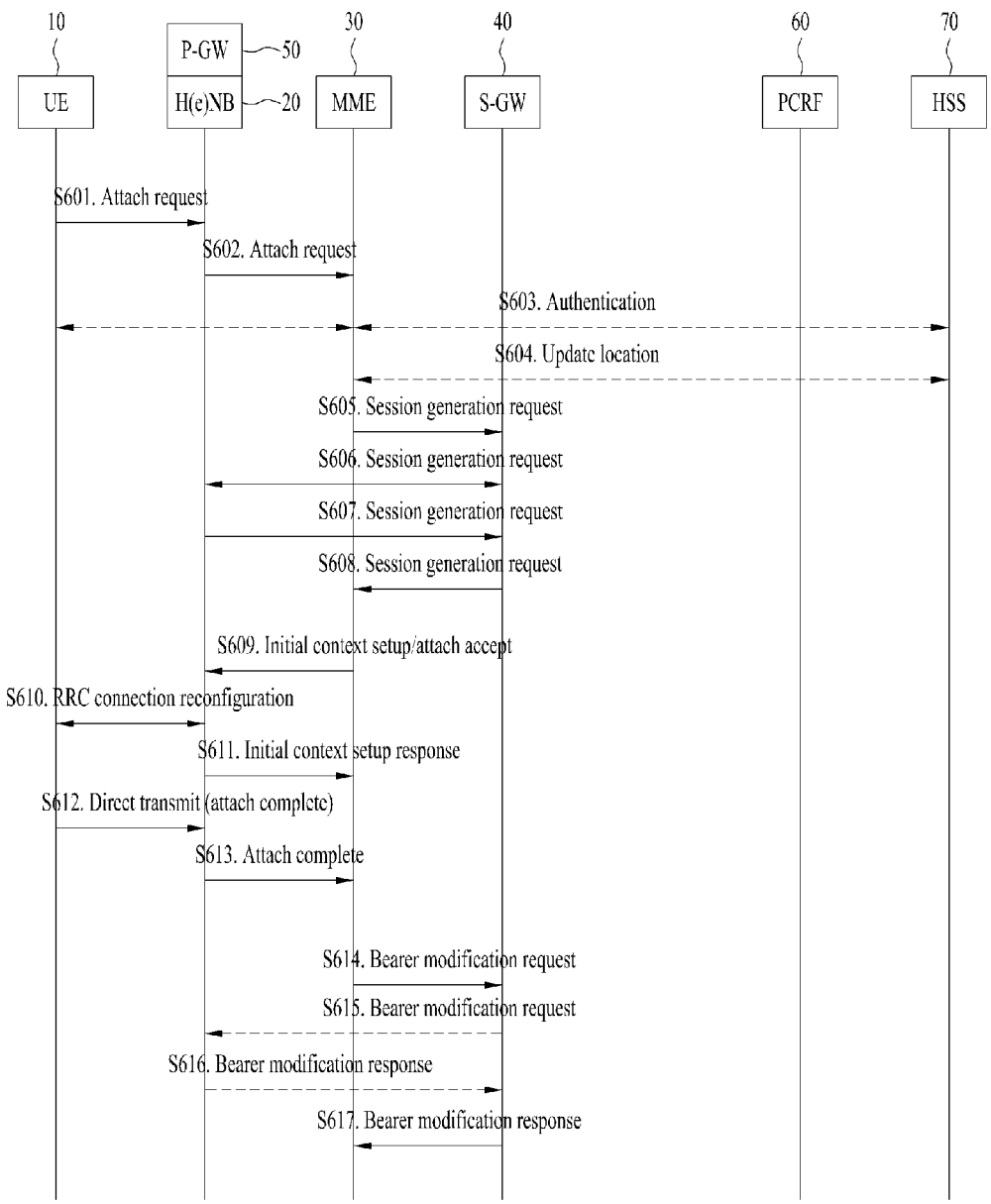
FIG. 6 is a flowchart illustrating an initial attach operation for LIPA PDN connection.

FIG. 6 is a flowchart for describing an initial attach operation for a LIPA PDN connection. Unlike FIGS. 4 and 5 illustrating EPS initial attach procedures, FIG. 6 corresponds to a LIPA initial attach procedure.

In steps S601 and S602, the UE 10 may send an attach request message via the H(e)NB 20 to the MME 30. In this case, the UE 10 may also send an APN of a PDN to which a connection is desired, together with the attach request. In the case of LIPA, a LIPA APN of a home based network may be sent as the APN. The H(e)NB 20 may transmit the attach request message to the MME 30 by adding a CSG ID, a HeNB access mode and an address of a co-located L-GW 50 to information received from the UE 10.

In steps S603 and S604, the MME 30 may perform an authentication procedure on the UE 10, and register location information of the UE 10 in the HSS 70. In this operation, the HSS 70 may transmit subscriber information of the UE 10 to the MME 30. The subscriber information stored in the HSS 70 may also include CSG subscription information and LIPA information. The CSG subscription information may include information about a CSG ID and an expiration time. The LIPA information may include indication information indicating whether LIPA is permitted to a corresponding PLMN and information about LIPA permission of a corresponding APN. As described above, LIPA permission may correspond to one of LIPA-prohibited, LIPA-only and LIPA-conditional. The CSG subscription information and the LIPA information may be additionally provided from the HSS 70 to the MME 30.

In steps S605 to S608, the MME 30 may perform evaluation for control of a CSG and a LIPA APN based on the CSG subscription information, the H(e)NB access mode and LIPA information. Evaluation may include CSG membership check, LIPA-permission check, etc. As a result of evaluation, if the UE 10 is permitted to access the LIPA APN via the H(e)NB 20, the MME 30 may send a create session request message to the S-GW 40 to establish an EPS default bearer. The S-GW 40 may send the create session request message to a P-GW. In the case of LIPA, the address of the L-GW 50 received from the H(e)NB 20 is used to select the P-GW. In response to this message, the P-GW (or the L-GW 50) may send a create session response message to the S-GW 40, and the S-GW 40 may send the create session response to the MME 30. Through these operations, the S-GW 40 and the P-GW (or the L-GW 50) may exchange TEIDs, and the MME 30 may recognize the TEIDs of the S-GW 40 and the P-GW (or the L-GW 50). In addition, the LIPA APN information may also be transmitted to the MME 30 together with the create session response message.

In the case of LIPA APN of LIPA-conditional, if the MME 30 has received information (e.g., address) about the L-GW 50 from the H(e)NB 20, a LIPA connection may be attempted. If the MME 30 has not received the information about the L-GW 50 from the H(e)NB 20, a P-GW selection function for a PDN connection may be performed.

In step S609, an attach accept message may be transmitted from the MME 30 to the H(e)NB 20. This message initiates radio resource setup in a RAN period (between the UE 10 and the H(e)NB 20) by requesting initial context setup. In this case, the above-described PDN connection type can indicate LIPA, and correlation ID information for a user plane direct link path between the H(e)NB 20 and the L-GW 50 may also be transmitted together with the attach accept message. The correlation ID corresponds to an ID of the L-GW 50, and a TEID of the P-GW may be provided as the ID of the L-GW 50 if the L-GW 50 serves as the P-GW.

In step S610, RRC connection reconfiguration is performed. As such, radio resources of the RAN period are set up and a result thereof may be transmitted to the H(e)NB 20.

In step S611, the H(e)NB 20 may transmit an initial context setup response message to the MME 30. A result of radio bearer setup may also be transmitted together with this message.

In steps S612 and S613, an attach complete message may be sent from the UE 10 via the H(e)NB 20 to the MME 30. In this case, the H(e)NB 20 may also send a TEID of the H(e)NB 20 for DL data together with this message.

In steps S614 to S617, a modify bearer request message may be transmitted from the MME 30 to the S-GW 40 and this message may deliver the TEID of the H(e)NB 20 for DL data to the S-GW 40. As optional operations, in steps S615 and S616, the bearer between the S-GW 40 and the P-GW (or the L-GW 50) may be updated as necessary.

Figure 7:
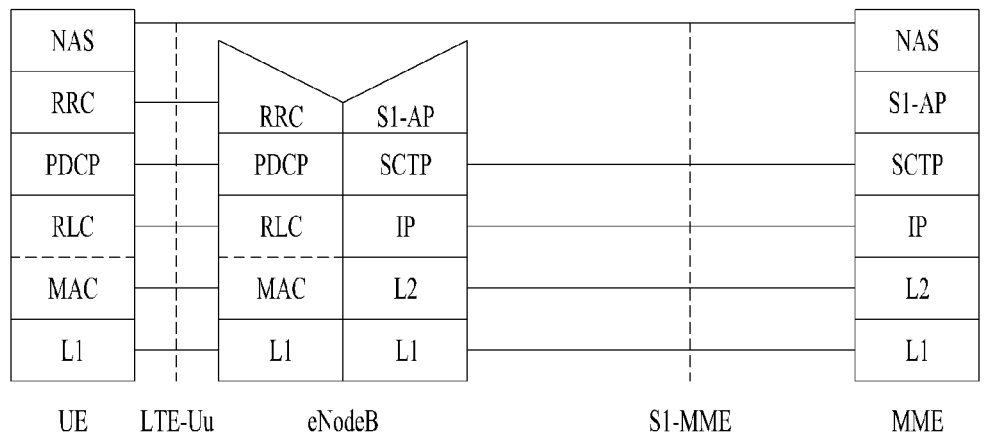
FIG. 7 illustrates a control plane with respect to an interface among a UE, an eNB and an MME.

FIG. 7 is a view illustrating a control plane for interfaces among a UE, an eNB and an MME.

The MME may perform access control on the UE that attempts access, and interfaces and protocol stacks used therefor are as illustrated in FIG. 7. The interfaces illustrated in FIG. 7 correspond to those among the UE, the eNB and the MME in FIG. 2. Specifically, a control plane interface between the UE and the eNB is defined as LTE-Uu, and a control plane interface between the eNB and the MME is defined as S1-MME. For example, an attach request/response message between the eNB and the MME may be transmitted and received via the S1-MME interface using an S1-AP protocol.

Figure 8:
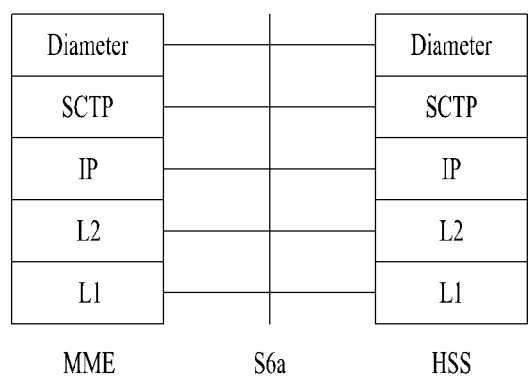
FIG. 8 illustrates a control plane with respect to an interface between an MME and an HSS.

FIG. 8 is a view illustrating a control plane for an interface between an MME and an HSS.

A control plane interface between the MME and the HSS is defined as S6a. The interface illustrated in FIG. 8 corresponds to that between the MME and the HSS in FIG. 2. For example, the MME may receive subscription information from the HSS via the S6-a interface using a Diameter protocol.

FIG. 9 is a view illustrating a control plane for interfaces among an MME, an S-GW and a P-GW.

A control plane interface between the MME and the S-GW is defined as S11 (FIG. 9(*a*)), and a control plane interface between the S-GW and the P-GW is defined as S5 (when not roamed) or S8 (when roamed) (FIG. 9(*b*)). The interfaces illustrated in FIG. 9 correspond to those among the MME, the S-GW and the P-GW in FIG. 2. For example, a request/response message for EPC bearer setup (or GTP (GPRS Tunneling Protocol) tunnel establishment) between the MME and the S-GW may be transmitted and received via the S11 interface using a GTP or GTPv2 protocol. In addition, a request/response message for bearer setup between the S-GW and the P-GW may be transmitted and received via the S5 or S8 interface using a GTPv2 protocol. The GTP-C protocol illustrated in FIG. 9 refers to a GTP protocol for a control plane.

A description is now given of bearer establishment and QoS, policy and, more particularly, an Aggregate Maximum Bit Rate (AMBR) application method of a legacy 3GPP system with reference to FIG. 4. The following description will be given of only QoS and policy of an initial access procedure, and reference can be made to the description of FIG. 4 for parts not described here. In this case, the AMBR includes an APN-AMBR and a UE-AMBR, where the APN-AMBR refers to a total bit rate permitted for all non-GBR bearers associated with a specific APN and the UE-AMBR refers to a total bit rate permitted for all non-GBR bearers of a UE. The APN-AMBR for UL data is enforced by an eNB and a PDN-GW, and the APN-AMBR for DL data is enforced by a PDN-GW. The UE-AMBR for UL/DL data is enforced by an eNB.

In step S404 of FIG. 4, location information is registered in the HSS. In this operation, the HSS transmits subscriber information of a corresponding UE to the MME. The subscriber information stored in the HSS includes QoS-related values such as APN-AMBR and UE-AMBR.

In steps S405 to S409, the MME sends a create session request message to the S-GW to establish an EPS default bearer. The S-GW sends the create session request message to the P-GW. Through these operations, the S-GW and the P-GW exchanges TEIDs, and the MME recognizes the TEIDs of the S-GW/P-GW. The create session request message also includes APN-AMBR information. The P-GW transmits an ultimately determined APN-AMBR value to the S-GW in a create session response, and this information is transmitted to the MME.

In step S407, PCRF interaction for operator policies is performed between the P-GW and the PCRF as necessary. The PCRF may modify and transmit the APN-AMBR value to the P-GW as necessary.

In step S410, an attach accept message is transmitted to the eNB. At this time, the attach accept message includes the TEID of the S-GW for UL data. In addition, this message initiates radio resource setup in a RAN period. In this case, the MME determines a UE-AMBR value to be used by the eNB and sends the determined value in the attach accept message.

Enforcement of QOS including the aforementioned AMBR, a policy and the like, that is, the PCEF may be included in a P-GW. Selection of the P-GW to execute the function of PCEF may be performed by an MME. For P-GW selection, additional criteria such as subscriber information from the HSS, SIPTO/LIPA support per APN and load balancing between P-GWs can be used. That is, the HSS can transmit P-GW ID (identity) and APN related information to the MME in the aforementioned step S404 of registering location information in the HSS, shown in FIG. 4. The MME can select a (dynamically assigned) P-GW from the P-GW corresponding to the P-GW ID transmitted from the HSS and a new P-GW. The P-GW ID transmitted from the HSS may include the IP address of the P-GW. If the P-GW ID does not include the IP address of the P-GW, the MME can acquire the IP address or an IP address list through an inquiry process with a DNS server. The MME may receive a weight factor associated with P-GW selection upon receiving the IP address in the DNS inquiry process. The weight factor must be considered in P-GW selection by the MME when load balancing is needed. Refer to 3GPP TS 23.401 for details of P-GW selection.

The aforementioned conventional method for selecting a P-GW to perform the function of PCEF is based on individual UEs and does not consider a group, a group policy and the like. In this case, considering MTC groups, different P-GWs may be selected for UEs belonging to one MTC group. This can cause difficulty in group based policy enforcement and QoS management for the UEs belonging to the MTC group. More specifically, UEs that belong to a group individually select P-GWs to execute the PCEF and a plurality of network nodes manages QoS/PCC parameter values for performing a group policy. Accordingly, to apply a policy for one group, a higher layer needs a central network node for managing the plurality of network nodes. Therefore, a logical additional layer is required in order to manage a group policy. Further, the number of signals between network nodes increases since information on network nodes needs to be concentrated on the central management node and consumption of network resources increases since load is increased. In addition, a time difference due to information exchange is generated and thus there is a difficulty in accurate real-time management. For example, group AMBR management additionally requires signaling between P-GWs and makes real-time management difficult.

Therefore, it is necessary to appropriately select a P-GW to execute the function of PCEF for performing a group based policy using QoS/PCC parameters such as the (group) AMBR for one MTC group. A description will be given of a method for selecting a P-GW according to the present invention.

The method for selecting a P-GW according to the present invention may be started with an initial attach request or PDN connectivity request of a UE to an MME. The UE that performs the request belongs to an (MTC) group and the request may be a request for an APN to which a group policy is applied. The request may include the corresponding APN, information representing the request to a group APN, information about intention or preference for application of the group policy, and information about a group such as a group ID.

Upon reception of the initial attach request or PDN connectivity request of the UE, which includes the information about the group, the MME may retrieve subscriber information from an HSS. Prior to this operation, the MME may determine whether the initial attach request or PDN connectivity request is a first request from the group to which the UE belongs. This may be performed to enable UEs, which belong to the group including the UE that transmits the attach request, to select the same P-GW that will perform function of PCEF on the group. More specifically, the MME may determine whether the attach request of the UE is a first request from the group and select an appropriate P-GW on the basis of the subscriber information from the HSS, as described below, when the attach request is the first request. When the attach request is a third or later request, the same P-GW as the P-GW selected for the group at the first request can be selected. Accordingly, the P-GW selected at the first request may be marked or stored in a different network node, server and the like.

The MME may check whether a P-GW that has been selected for the group is present upon confirmation that the attach request is the third or later request after determining whether the attach request is the first request. This operation is performed in order to prevent UEs included in the group from selecting different P-GWs through respective P-GW selection procedures for the group, which will be described later, when the UEs almost simultaneously transmit attach requests or the like. That is, when a P-GW that has been selected for the group is not present, the MME can hold the attach request for a predetermined time required to select and/or store the P-GW according to the first request from the group. To prevent different P-GWs from being selected according to attach requests which are almost simultaneously performed, it is possible to employ a method by which the MME transmits, to the HSS, an indication for announcing that P-GW selection needs to be performed for the group policy in a procedure of retrieving the subscriber information from the HSS and the HSS maintains the indication until P-GW selection according to the first request is completed. Alternatively, the HSS may recognize that the request is a request for connection to the APN to which the group policy needs to be applied even when the indication is not transmitted from the MME and maintain information representing presence of a group policy related session.

The operation of determining whether the attach request is the first request from the group and/or the operation of checking whether a P-GW that has been selected for the group is present when the attach request is the third or later request may be performed by the HSS instead of the MME as described later.

The subscriber information received from the HSS may include i) information about a PDN subscriber context with respect to the corresponding APN, ii) parameter values newly defined for the group, which indicate whether the group policy can be applied, group-APN-AMBR and the like. For example, APN-configuration can be as shown in FIG. 3. However, APN-configuration shown in FIG. 3 is exemplary and [Group-policy-permission] may be defined in such a manner that part thereof is included in the existing permission and may be included as part of group related subscriber information.

TABLE 3

APN-Configuration ::= <AVP header: 1430 10415>
{ Context-Identifier }
* 2 [ Served-Party-IP-Address ]
{ PDN-Type }
{ Service-Selection}
[ EPS-Subscribed-QoS Profile ]
[ VPLMN-Dynamic-Address-Allowed ]
[MIP6-Agent-Info ]
[ Visited-Network-Identifier ]
[ PDN-GW-Allocation-Type ]
[ 3GPP-Charging-Characteristics ]
[ AMBR ]

TABLE 3-continued

[Group-APN-AMBR]
[Group-policy-permission]
*[ Specific-APN-Info ]
  [ APN-OI-Replacement ]
[Group-SIPTO-Permission]
  [ SIPTO-Permission ]
  [ LIPA-Permission ]
*[ AVP ]

The MME can select a P-GW to perform the function of PCEF on the group in consideration of i) information about presence of a group-policy session maintained by the HSS or whether or not the group-policy session is started, ii) information on mapping between APNs and P-GWs preset to the MME, iii) values which were considered for P-GW selection in SIPTO (a tracking area identity (TAI), a serving eNodeB identifier or a TAI according to operator arrangement and/or serving eNodeB identifier, etc.), iv) information about a preselected P-GW, obtained from the HSS, an AAA server, a DNS server or a third network node that manages the group (for example, P-GW capability considering a group size, i.e., capability of serving all UEs belonging to an arbitrary group in consideration of a potential size of the group, a weight factor received from the DNS being used or introduction of a new capability element being considered for the information) and the like, including the aforementioned subscriber information.

Information about the P-GW selected as described above may be registered/stored in the MME, HSS, AAA server, DNS server or the network node that manages the group. Here, the information about the P-GW may be identification information such as the IP address of the P-GW or P-GW ID.

Subsequently, the P-GW selected for the group can manage QoS, policy and the like for the corresponding group. The MME may confirm values with respect to sessions of UEs or multiple sessions of the same UE, to which the group policy for the corresponding APN is applied, and calculate statistical values as necessary. Specifically, the values may be i) GROUP-APN-AMBR values and values newly defined for the group policy, ii) APN-AMBR values, iii) AMBR values of each UE, iv) the number of connections to the corresponding APN (the number of bearers), v) the number of connections per UE connected to the corresponding APN (the number of bearers), vi) the number of UEs connected to the corresponding APN, and vii) other PDN related parameter values and other QoS parameter values. In addition, the P-GW may notify the network node (e.g. eNB) that performs policy enforcement or the corresponding UE of the collected information or a processed form of the information.

The P-GW selected for the group as described above may be reallocated as described below in order to perform load balancing or group SIPTO. P-GW reallocation for load balancing can be used in a case in which the network divides the group and manages the divided group for effective load balancing when group policy related traffic requests are continuously concentrated on one P-GW. To this end, the group-APN-AMB value can be divided into subsets (for example, the group value of 100 is divided into 50 and 50 as if two groups respectively corresponding to 50 and 50 are present). Alternatively, some UEs or some sessions may be distributed to other P-GWs through deactivation/reactivation similar to execution of SIPTO. The network node (HSS, AAA server, DNS server or third network node managing the group) and the UE may be notified of a result of the aforementioned operation before/after division. Here, the notification may include information on the divided group, information on groups regenerated from division of the group, parameter values with respect to policy enforcement and the like. Such information may be distributed and provided to network nodes and UEs and may be recorded in one integrated server. On the contrary, divided group traffic may be combined into one P-GW through deactivation/reactivation similar to execution of SIPTO according to the network policy. P-GW reallocation may be determined in consideration of the aforementioned information considered for P-GW selection, group traffic division history, whether or not dynamic group dispersion is permitted and the like.

To perform group-SIPTO, a P-GW may be reallocated. SIPTO for a group may be performed according to group-SIPTO permission of subscriber information and physical movement of the group (for example, a case in which UEs belonging to the same group are all moved by means such as a train/airplane). P-GW reallocation may be determined using the aforementioned information considered for P-GW selection.

A description will be given of a procedure of selecting a P-GW to perform function of PCEF on a group with reference to FIGS. 10, 11 and 12. Following description that is not mentioned above can be included in the above description.

Figure 10:
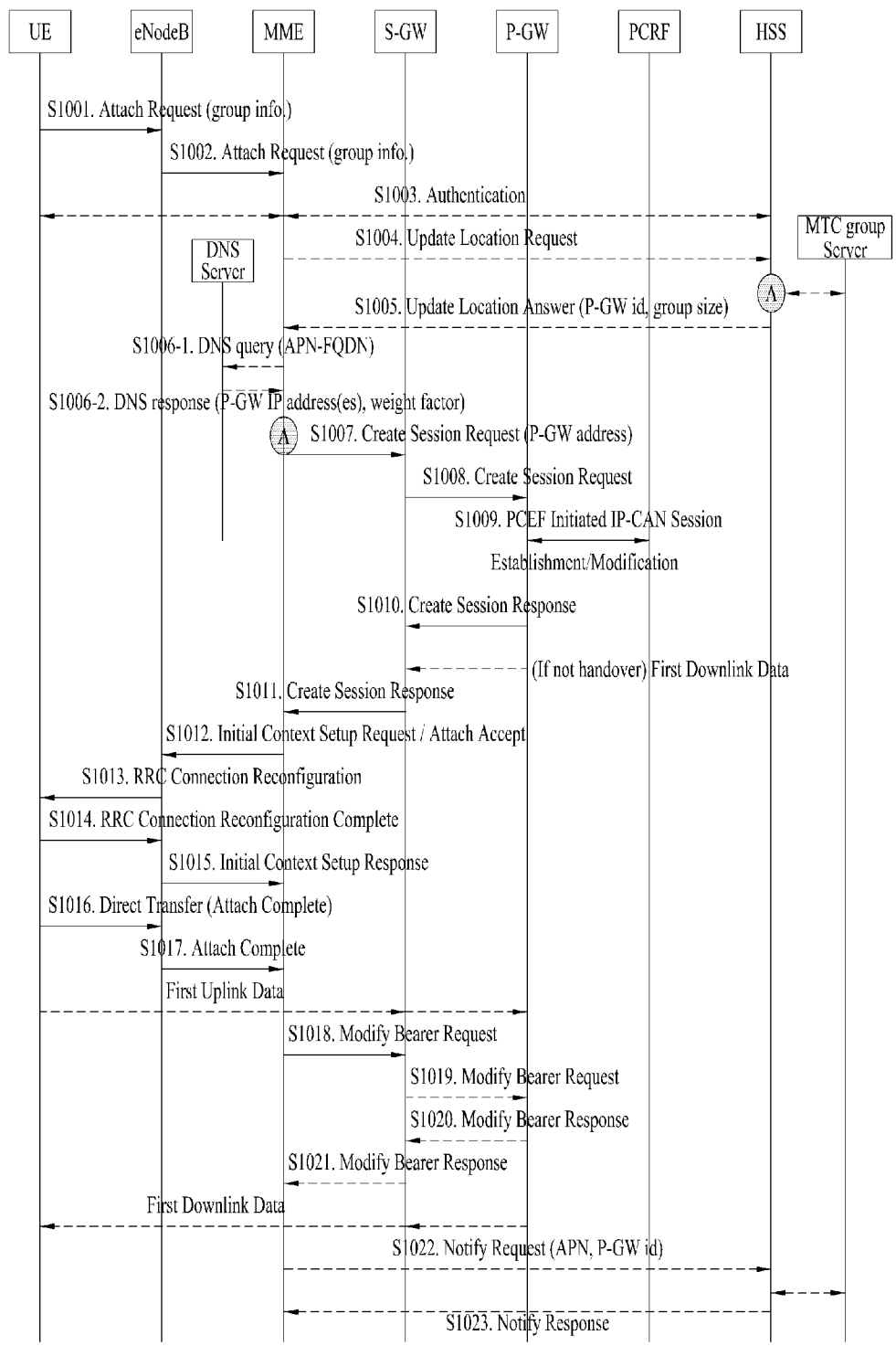
FIGS. 10 to 12 illustrate P-GW selection for a group according to embodiments of the present invention.

FIG. 10 illustrates an initial attach procedure including the procedure of selecting a P-GW to perform function of PCEF on a group.

Referring to FIG. 10, information about a group to which a corresponding UE belongs and a P-GW ID for a corresponding service are obtained from subscriber information in step S1005. In particular, subscriber information about a group service such as group permission and information related to a group size that directly/implicitly indicates the number of UEs included in the corresponding group or potential UEs that may be included in the group can be obtained. Here, an HSS can obtain the corresponding information through interaction with a third group server that manages the group service (previously or on request).

When the P-GW ID does not include a direct P-GW IP address, one or more IP address candidates can be obtained through a DNS query process in step S1006. Here, a relative weight between P-GWs, which is defined by a service provider, can be obtained along with the IP address candidates. For example, a weight can be newly defined as a relative value between P-GWs, which directly/implicitly indicates whether an arbitrary P-GW can cover a group size of a predetermined level. This value can be defined separately from a conventional weight value or the conventional weight value can be extended and applied as the value.

An MME may select a P-GW to perform PCEF on the group on the basis of one or more of various factors including the aforementioned subscriber information in step S1007. Subsequently, a bearer setup procedure with respect to the selected P-GW may be performed.

The PCEF of the corresponding group, that is, information about the P-GW is stored in the MME and the information is transmitted to the HSS or other network nodes and stored therein. That is, information about a corresponding APN and the P-GW is stored in the HSS/an MTX group server in step S1022. This information improves efficiency of group policy application by enabling a UE belonging to the same group to select the same PCEF, i.e., the P-GW.

Part A of FIG. 10 represents P-GW selection. If a P-GW for the corresponding group has already been allocated, the allocated P-GW can be used without selecting a P-GW. Accordingly, network nodes such as the MME and HSS can confirm the group and then check whether or not a P-GW that has already been allocated to the group is present.

Figure 11:
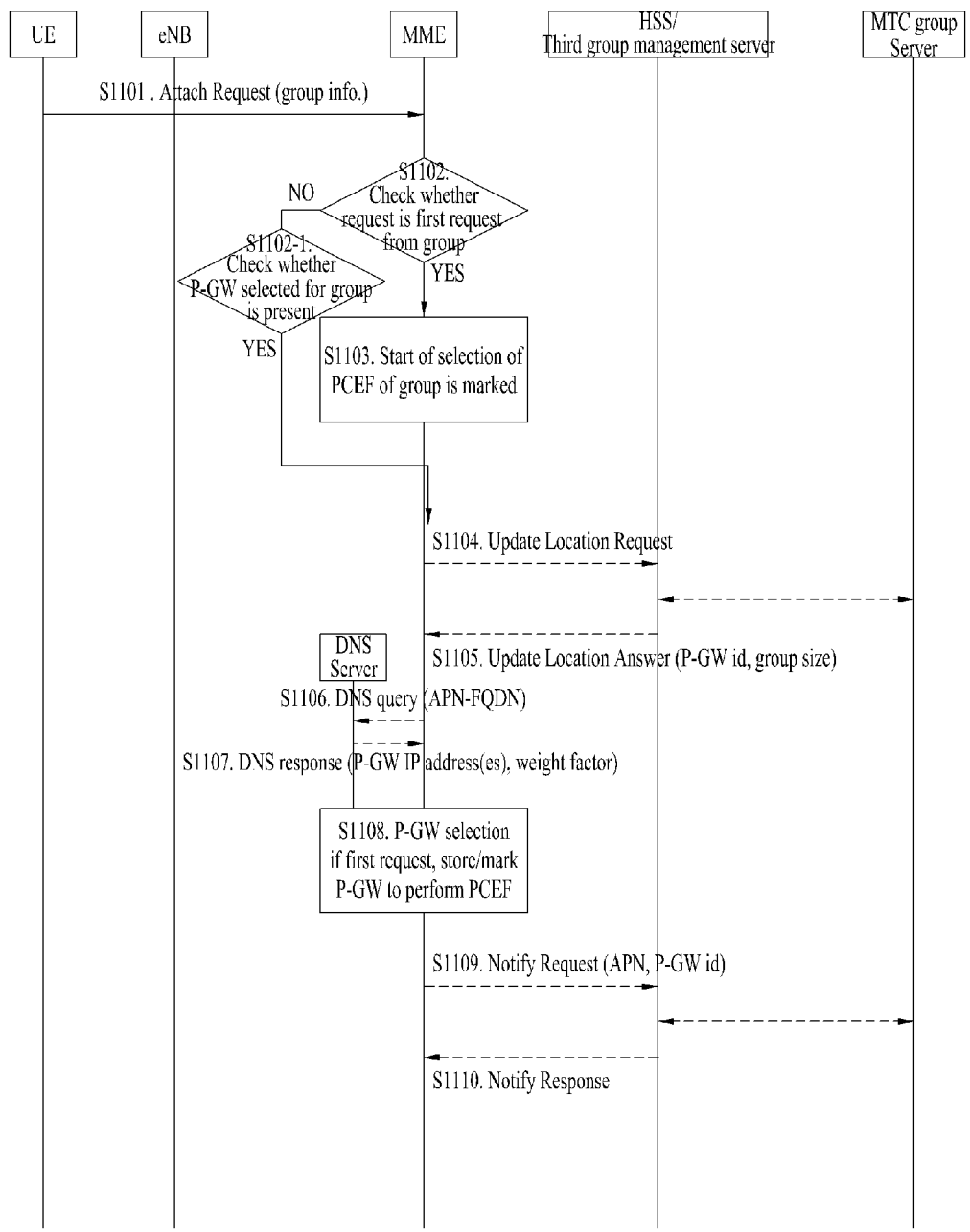

FIG. 11 illustrates P-GW selection for a group, which is related to an MME according to an embodiment of the present invention.

A UE belonging to an arbitrary group attempts network access in step S1101. Here, information about the group, such as a group ID, may be used. The MME checks whether a request from the UE is a first request from the group in step S1102. When the request is not the first request, information on a P-GW that has been set can be obtained through interaction between the HSS/DNS or a conventional P-GW selection procedure using information stored in the MME. Specifically, when the request is not the first request, it is possible to check whether a P-GW that has been selected for the group is present, as described above (step S1002-1). If the request is the first request from the group, the request is marked and then selection of a P-GW to perform the PCEF is started in step S1103. P-GW selection is finally determined by the MME after interaction with multiple network nodes as in the conventional method.

The MME starts to interact with the HSS using an update location request/response in step S1104. Here, the information about the group may be transmitted together with the update location request. In addition, the MME may directly/implicitly transmit information indicating whether the request is the first request. In step S1105, the MME may simultaneously obtain information that can be used for P-GW selection and receive subscriber information from the HSS. The HSS may obtain the related information through interaction with a third MTC server that manages the information about the group. Alternatively, the MME may directly interact with the third network node through a separate message/procedure without using the message/procedure of steps S1104/S1105.

In step S1106, a conventional DNS query may be used. Here, information related to the group, such as the group ID and group size may be additionally transmitted. In step S1107, when a weight between P-GWs is received, a value considering the group size (i.e. the number of UEs that are able to access the group/permitted to access the group and/or the number of currently connected UEs) and the like can be received. Alternatively, an additional weight may be received.

In step S1108, the MME may finally determine the P-GW on the basis of the obtained information and predetermined information. When the request is a request of a UE that attempts initial access in the group, the P-GW selected for the group is stored and marked. If the P-GW for the group is changed according to P-GW reselection/reallocation even though the request is not the request of the UE that attempts initial access (which is not shown), then changed information can be updated.

In steps S1109 and S1110, the MME may register the determined P-GW in the HSS using notification request/response messages. Here, the HSS may additionally register the P-GW in the third network node. Alternatively, the MME may directly register the P-GW in the third network node without passing through the HSS.

Figure 12:
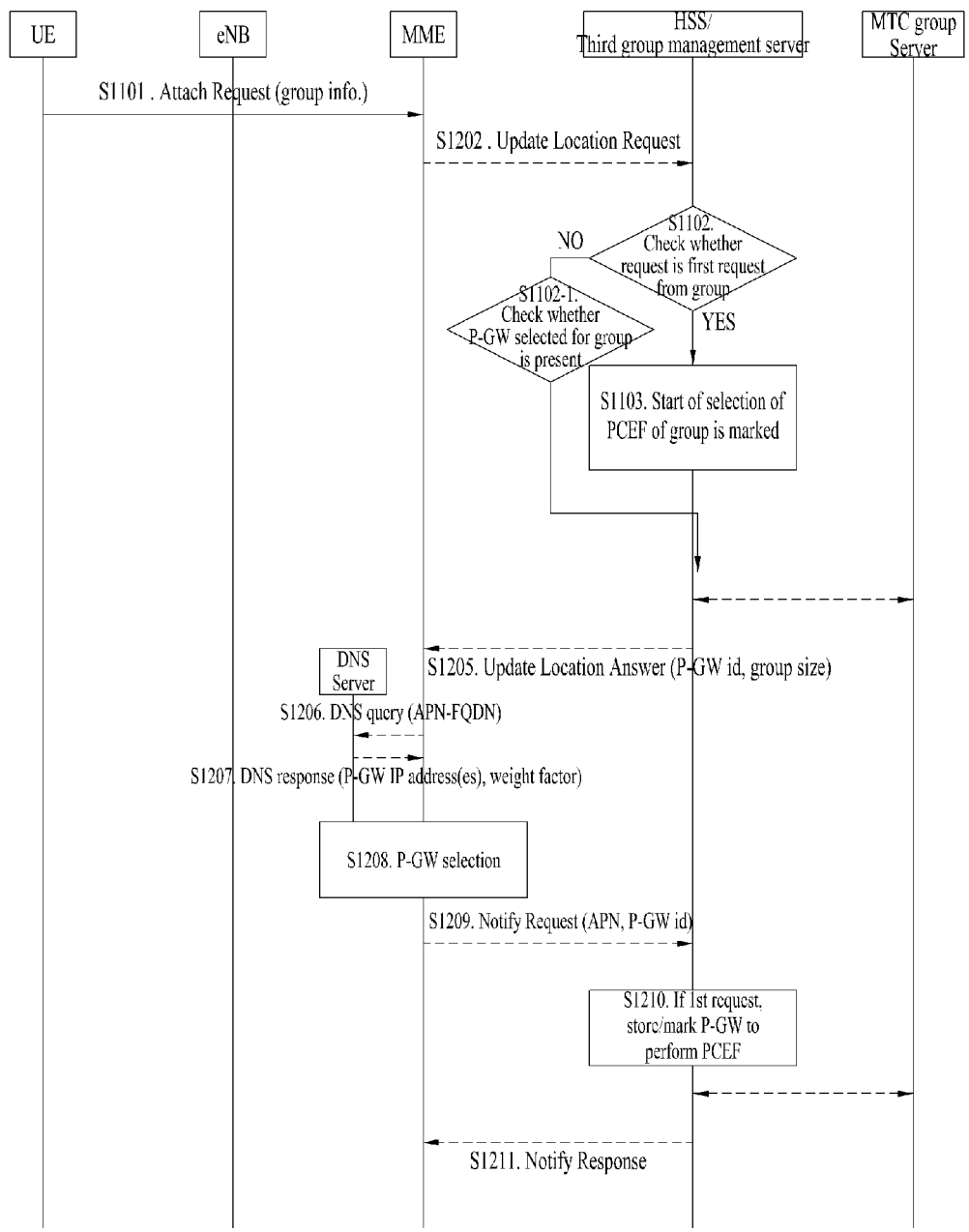

FIG. 12 illustrates selection of a P-GW for a group, which is related to an MME according to an embodiment of the present invention.

In step S1201, a UE belonging to an arbitrary group attempts network access in step S1201. Here, information about the group, such as a group ID, may be used. In step S1202, the MME may start interaction with an HSS using update location request/response messages. That is, the HSS can receive a request (including the information about the group) with respect to selection of a PCEF of the group.

In step S1203, the MME checks whether a request from the UE is a first request from the group. When the request is not the first request, P-GW information that has been set for the group according to the conventional method can be obtained. Specifically, when the request is not the first request, it is possible to check whether a P-GW that has been selected for the group is present, as described above (step S1203-1). If the request is the first request from the group, the request is marked and then selection of a P-GW to perform PCEF is started in step S1204. P-GW selection is performed by the MME after interaction with multiple network nodes.

In step S1205, the HSS may simultaneously transmit subscriber information and information that can be used for P-GW selection. The HSS may obtain the related information through interaction with a third MTC server that manages the information about the group. Alternatively, the third network node may directly interact with the MME through a separate message/procedure. In step S1206, a DNS query may be used. Here, information related to the group, such as the group ID and group size may be additionally transmitted. In step S1207, when a weight between P-GWs is received, a value considering the group size (i.e. the number of UEs that are able to access the group/permitted to access the group and/or the number of currently connected UEs) and the like can be received. Alternatively, an additional weight may be received.

In step S1208, the MME finally determines the P-GW on the basis of the obtained information and predetermined information. In step S1209-11, the MME registers the determined P-GW in the HSS using conventional notification request/response messages. Here, the HSS may additionally register the P-GW in the third network node. Alternatively, the MME may directly register the P-GW in the third network node without passing through the HSS. If the P-GW for the group is changed according to P-GW reselection/reallocation even though the request is not the request of the UE that attempts initial access (which is not shown), then changed information can be updated.

In the above description, the procedure of FIG. 11 which illustrates MME operation and the procedure of FIG. 12 which illustrates HSS operation may be combined and all or some steps of the procedures may be combined to configure various new procedures.

Figure 13:
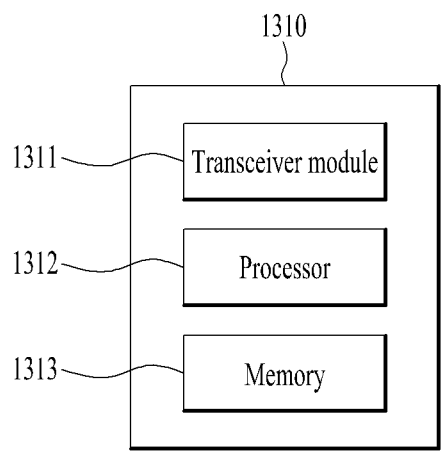
FIG. 13 illustrates a network node apparatus according to an embodiment of the present invention.

FIG. 13 illustrates a configuration of a network node apparatus according to an embodiment of the present invention.

Referring to FIG. 13, a P-GW 1310 according to an embodiment of the present invention may include a transceiver module 1311, a processor 1312 and a memory 1313. The transceiver module 1311 may be configured to transmit signals, data and information to external devices (network nodes (not shown) and/or servers (not shown)) and to receive signals, data and information from the external devices. The processor 1312 may be configured to control the overall operation of the P-GW 1310 and to process information to be transmitted from the P-GW 1310 to the external devices and information to be received from the external devices. The memory 1313 may store processed information for a predetermined time and may be replaced by a component such as a buffer (not shown).

The processor of the P-GW 1310 according to an embodiment of the present invention may process requirements for implementation of the aforementioned embodiments. Further, a configuration of the P-GW 1310 can be implemented such that the above-described various embodiments of the present invention are independently applied or two or more thereof are simultaneously applied and redundant description is omitted for clarity.

The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention can be applied to various mobile communication systems.

The invention claimed is:

1. A method for selecting a packet data network gateway (P-GW) by a network node in a wireless communication system, the method comprising:
receiving, from a terminal, an attach request including a machine type communication (MTC) group identifier,
determining whether the attach request is a first attach request for an MTC group identified by the MTC group identifier,
wherein the MTC group is configured for MTC terminals; and
selecting the P-GW to perform a function of a policy and charging enforcement function (PCEF) on the MTC group including the terminal,
wherein, when the attach request is the first attach request for the MTC group, the network node transmits information on the selected P-GW to a Home Subscriber Server (HSS) for registration, and
wherein, when the attach request is a second attach request or a later attach request for the MTC group, the selected P-GW is set to a pre-selected P-GW for the MTC group.

2. The method according to claim 1, when the attach request is the first attach request for the MTC group, the method further comprises:
receiving information on a plurality of packet data network gateways from the HSS,
wherein the selected P-GW is determined based on the information on the plurality of packet data network gateways, and
wherein the information on the plurality of packet data network gateways includes weight values for the plurality of packet data network gateways.

3. The method according to claim 1, wherein the function of PCEF includes group aggregated maximum bit rate (AMBR) management of the MTC group on the basis of a user plane data maximum bit rate (MBR) of the terminal.

4. The method according to claim 1, wherein the selected P-GW is for one Access Point Name (APN).

5. The method according to claim 1, wherein the network node is one of a mobility management entity (MME) and a serving general packet radio service (SGSN) supporting node.

6. A method whereby a network node supports packet data network-Gateway (P-GW) selection in a wireless communication system, the method comprising:
receiving, from a terminal, a request with respect to selection of a Policy and Charging Enforcement Function (PCEF) for a machine type communication (MTC) group configured for MTC terminals,
wherein the request includes a MTC group identifier of the MTC group;
determining whether the request is a first request for the MTC group from the MTC terminals of the MTC group based on the MTC group identifier; and
transmitting, to a mobility management entity (MME), information to be used for selection of the P-GW to perform a function of the PCEF on the MTC group to which the terminal belongs,
wherein the network node receives the information on the selected P-GW and then registers the information when the request with respect to PCEF selection for the MTC group is the first request from the MTC terminals of the MTC group, and
wherein the information to be used for the P-GW selection includes information on a P-GW pre-selected for the MTC group when the request with respect to PCEF selection is a second request or a later request from the MTC terminals of the MTC group.

7. The method according to claim 6, wherein, when the request with respect to the PCEF selection is the first request from the MTC terminals of the MTC group, the method further comprises:

transmitting information on a plurality of packet data network gateways to be used for the P-GW selection to the MME, wherein the information on the plurality of packet data network gateways includes weight values for the plurality of packet data network gateways.

8. The method according to claim 6, further comprising checking whether or not a P-GW selected for the MTC group is present when the request with respect to PCEF selection is the second or later request from the MTC terminals of the MTC group.

9. The method according to claim 6, wherein the function of PCEF includes group Aggregate Maximum Bit Rate (AMBR) management of the group on the basis of a user plane data Maximum Bit Rate (MBR) of the terminal.

10. The method according to claim 6, wherein the selected P-GW is for one Access Point Name (APN).

11. The method according to claim 6, wherein the network node is a Home Subscriber Server (HSS).

* * * * *